United States Patent [19]

Straumann

[11] 4,115,156

[45] Sep. 19, 1978

[54] METHOD OF MANUFACTURING A BEARING PART

[75] Inventor: Fritz Straumann, Waldenburg, Switzerland

[73] Assignee: Institut Dr. Ing. Reinhard Straumann AG, Switzerland

[21] Appl. No.: 656,851

[22] Filed: Feb. 10, 1976

[30] Foreign Application Priority Data

Feb. 10, 1975 [CH] Switzerland ............ 1587/75

[51] Int. Cl.² .............................. C22F 1/02
[52] U.S. Cl. ............... 148/12.7 N; 148/13.1; 148/20.3; 148/31.5; 148/32.5; 148/158; 148/162
[58] Field of Search ............ 308/241; 29/148.51 D; 148/12.7 N, 13.1, 20.3, 158, 162, 31.5, 32.5, 6.3

[56] References Cited

U.S. PATENT DOCUMENTS

| 2,973,291 | 2/1961 | Straumann | 148/12.7 N |
| 3,222,228 | 12/1965 | Stanley et al. | 148/31.5 |

Primary Examiner—R. Dean
Attorney, Agent, or Firm—McGlew and Tuttle

[57] ABSTRACT

A bearing part comprises an age hardened cobalt alloy having a bearing surface exposed to bearing friction provided with a boride covering layer. The bearing part is manufactured by forming a ductile age hardening alloy of cobalt and ageing it by heat treatment and meanwhile depositing a layer of boride onto the bearing portion of the alloy at a temperature of from between 550° to 900° C by diffusion from a vapor phase or a solid phase.

3 Claims, 1 Drawing Figure

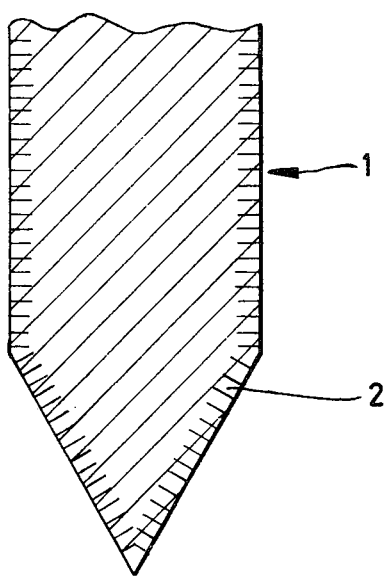

METHOD OF MANUFACTURING A BEARING PART

BACKGROUND OF THE INVENTION

1. Field of the Invention

This invention relates in general to the construction of bearings and in particular to a new and useful method of forming a bearing of a cobalt alloy with a boride coating thereon.

The present invention is particularly applicable to component parts which are in frictional contact and which may be referred to as bearing parts. Such parts include journal pins of pointer shafts for electrical measurement instruments and bushings and journals of any kind and particularly those used in the field of precision mechanics. Bearing parts of particularly high hardness especially bearing journals in conical and cylindrical bearings are made at the present time of sintered hard metals and consequently these hard metals are affected by the high brittleness typical of such materials and in some instances they even break during the mounting thereof. Metallic bearing parts of lower hardness than the hard metal bearings frequently employed are subject to considerable wear which is not infrequently connected with corrosion phenomena.

2. Summary of the Invention

In accordance with the invention a bearing part is provided which is made of an age hardening cobalt alloy coated at least over its surface portions which are exposed to bearing friction with a boride layer. Such bearing parts have excellent frictional, wearing and endurance properties and are free from the drawbacks which occur with the prior art devices as mentioned above. In spite of the very high superficial hardness, such bearing parts are not brittle and show a high resistance to corrosion and are non-magnetic.

In accordance with the method of the invention a bearing part is manufactured of a ductile cobalt alloy which is capable of being age hardened by heat treatment which is shaped in the desired form of the bearing and thereafter is coated with a boride layer over the area which is to be employed as a bearing surface. The coating is accomplished either from the vapor phase or by diffusion from a solid phase and is carried out during a heat treatment at a temperature in the range of from 550° C. to 900° C. and by the same heat treatment an age hardening process is effected.

Accordingly it is an object of the invention to provide an improved bearing construction comprising a cobalt alloy base and a covering on a bearing surface of a boride.

A further object of the invention is to provide a method of forming a bearing which comprises forming a ductile alloy of cobalt and age hardening it by heat treatment and depositing during the same heat treatment a layer of boride over the alloy at a temperature of from between 550° C. to 900° C.

A further object of the invention is to provide a bearing structure which is simple in design, rugged in construction and economical to manufacture.

For an understanding of the principles of the invention, reference is made to the following description of a typical embodiment thereof as illustrated in the accompanying drawing.

BRIEF DESCRIPTION OF THE DRAWING

The only FIGURE of the drawing is a sectional view of a bearing constructed in accordance with the invention.

GENERAL DESCRIPTION OF PREFERRED EMBODIMENT

Referring to the drawing in particular the invention embodied therein comprises a pivot point generally designated 1 which is machined most advantageously from a cold-formed wire and then polished. Subsequently the point is treated at a temperature of from between 550° C. to 900° C. in a boron-containing medium for example a boron-containing gas or a boron powder. Because of the heat treatment an age hardening process which increases the hardness of the material takes place and the boron-containing medium causes a build-up or deposit of a very hard boride layer 2 on the surface of the point 1. It should be noted in this connection that the quality of the polishing prior to the coating substantially influences the superficial quality of the boride layer since a diffusion process is involved.

It should also be appreciated that the degree of cold working to which the part has been subjected determines the ageing process and thereby indirectly the quality of the layer of boride. The degree of working influences directly the hardness of the backing material and the temperature as well as the duration of heat treatment have to be adjusted to the degree of deformation if optimum hardnesses are to be obtained. At the same time the temperature and duration of the heat treatment influence the thickness of the forming layer of boride.

In accordance with the invention it is advantageous to start from a ductile age hardenable cobalt alloy which comprises from 18 to 50% Co, 16 to 65% Ni, 1 to 10% Mo, 10 to 20% Cr, up to 10% W and up to 20% Fe, and Ti and Be conjointly up to 4%.

As has been proved by tests cobalt alloys can be very well boronated. According to microprobe analysis and x-ray diffraction analysis of the atomic structure, the boride layer is a diffusion layer having the approximate composition of $Co_3B$. This cobalt-boride layer has a Vickers microhardness of approximately 2600 kg/mm$^2$ and a very high endurance. In comparison therewith for example bearing parts of hardened steel have a Vickers microhardness of only about 700 to 900 kg/mm$^2$ and in addition they are frequently not sufficiently resistant to corrosion and this may cause a definite reduction in their endurance and service. In contradistinction thereto the corrosion resistance of the cobalt boride layer and of the backing material is excellent. Hard metal bearing points might have a Vickers microhardness in the order of magnitude of 2000 kg/mm$^2$ however they are extremely brittle.

Bearing parts in accordance with the invention have bearing surfaces which are at least of the same hardness but without being brittle since the backing material is more ductile than a hard metal. The boride layer is a diffusion layer having an adhesive strength which is greater than the adhesive strength of an electrodeposited coating.

In conclusion a special feature of the inventive method is that during a heat treatment two completely different processes take place at the same time and temperature which are made possible by using an age hardening high strength ductile cobalt alloy which is well boronatable and age hardens simultaneously with boronation. Hardness Vickers of the backing material of up to 800 kg/mm² may be obtained. With other materials at these temperatures of boronation relaxation and recrystallization phenomena occur which may cause a dropping of the hardness of the backing material down to 220 kg/mm². However a hard layer on a too soft back behaves similar to ice on water. If a hard layer on a too soft back breaks down, the bearing is very rapidly destroyed.

The advantages of a bearing part manufacture in accordance with the invention are therefore to be seen in that the part is non-magnetic and corrosion resistant and comprises a superficial layer which is very hard and has excellent wearing and running properties, and which further comprises a backing material which has a hardness insuring a good support for the layer without being brittle.

While a specific embodiment of the invention has been shown and described in detail to illustrate the application of the principles of the invention, it will be understood that the invention may be embodied otherwise without departing from such principles.

What is claimed is:

1. A method of manufacturing a bearing part comprising forming a ductile age-hardening alloy of cobalt into a bearing part and aging it by heat treatment, and diffusing boron during the same heat treatment to form a boride layer at and into the bearing surface portion of the bearing part at a temperature of from 550°–900° C. wherein said cobalt alloy consists essentially of from 18–50% cobalt, 13–65% nickel, 1–10% Mo, 10–20% chromium, up to 10% W and up to 20% Fe and up to 4% of Ti and Be.

2. A method according to claim 1, wherein said layer is formed by diffusion from a vapor phase.

3. A method according to claim 1, wherein said layer is formed by diffusion from a solid phase.

* * * * *